TRANSFER MECHANISM FOR STORAGE DEVICES

Filed Sept. 6, 1957 6 Sheets-Sheet 1

INVENTORS
THOMAS H. ROWE
JAMES P. HAMMER
CHARLES J. KENNEDY

BY James K. Moran
AGENT

July 24, 1962 T. H. ROWE ETAL 3,046,528

TRANSFER MECHANISM FOR STORAGE DEVICES

Filed Sept. 6, 1957 6 Sheets-Sheet 6

3,046,528

United States Patent Office 3,046,528

Patented July 24, 1962

3,046,528

TRANSFER MECHANISM FOR STORAGE DEVICES

Thomas H. Rowe, James P. Hammer, and Charles J. Kennedy, Endicott, N.Y., assignors to International Business Machines Corporation, New York, N.Y., a corporation of New York Filed Sept. 6, 1957, Ser. No. 682,515
15 Claims. (Cl. 340—172.5)

Figure 1:
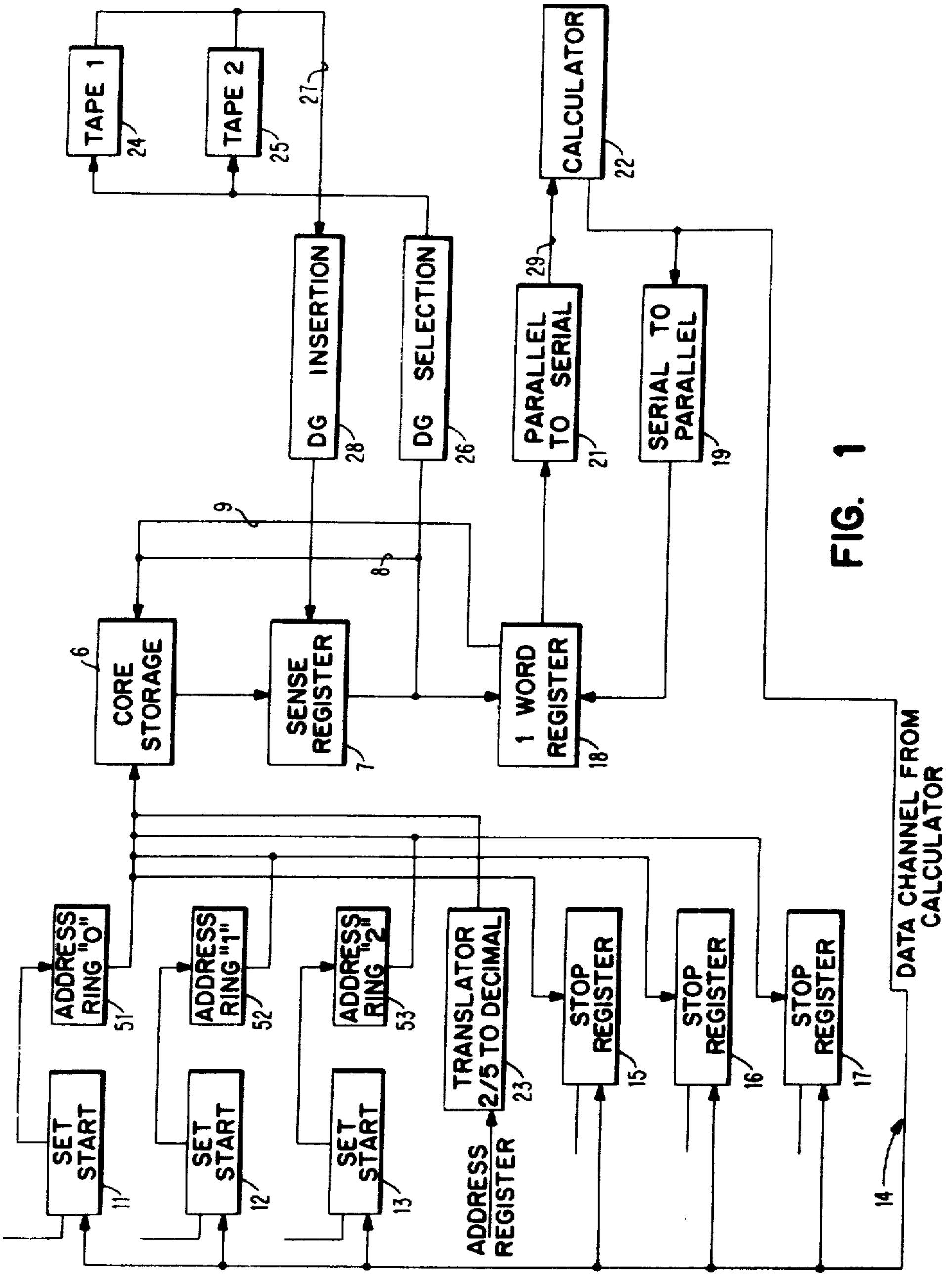

This invention relates to storage systems for digital data processing machines and more particularly to improvements in the flexibility of entry of and access to data in such storage systems.

Static data storage apparatus such as magnetic core arrays with their associated driving and sensing circuits are relatively expensive items in data processing systems. These static storage devices are capable of very fast operation as compared to magnetic drums or tapes. It is therefore desirable to make the fullest use of the static data storage devices in data processing systems in order to provide the most economical structure.

A static data storage device is a storage device in which an element stores a "bit" of information and maintains the "bit" available for access at any time. Well known static storage devices include magnetic cores, condensers, trigger tube pairs and the like. In contrast to this, data stored on a magnetic drum or magnetic tape is available only when the data passes under a reading head. Static data storage devices are thus generally capable of much faster operation than dynamic storage devices.

The present storage system is designed for operation with a machine of the type shown in Hamilton et al. Patent No. 2,959,351 issued November 8, 1960, and assigned to the present assignee. The machine disclosed in this copending application is a data processing machine provided with a magnetic drum for storing quantities of data as magnetized spots on its surface. Compared to a magnetic core storage array, the speed at which data may be taken from or placed on such a magnetic drum is relatively slow. For this reason, a magnetic drum will be referred to as a slow speed data storage device in the present application. The above-identified application also shows a program storage device for storing a single program step or word. The program word is divided into three portions: an address portion for instructing the machine where data to be processed is located in storage on the drum, or elsewhere; an operation portion for instructing the machine what operation or process the machine is to perform with the data found at the address of the address portion, and in instruction portion for instructing the machine where the next program word is located in storage. An address register and an operation register are provided for receiving the address portion and the operation portion respectively from the program storage device. Switching circuitry is provided under the control of the address register for selecting any storage position on the drum or any other storage device in the machine in accordance with the value stored in the address register. Switching circuitry is also provided under the control of the operation register for determining the operation the machine is to perform on the data found at the selected address position. After an address is selected and the data found at the address is operated upon by the machine, the instruction portion of the program value is entered into the address register from program storage to replace the value previously in the register. A new program step located at the address in storage corresponding to the instruction portion of the program step in the address register is selected and transferred into the program storage device to replace the value previously stored therein.

For storage devices of equal storage capacity, static storage devices such as magnetic core arrays are far more expensive to build than dynamic storage devices such as magnetic drums or magnetic tapes. Thus, for a static data storage device to be economically used in a data processing system, the static data storage device must be kept busy a maximum amount of time and accommodate the needs of a plurality of slower speed data storage devices. The present invention is accordingly directed to a system for efficiently making use of a static data storage device.

Accordingly, an object of the present invention is to provide an improved data storage system for a data processing machine.

Another object of the present invention is to provide an improved data storage system for a data processing machine requiring a minimum of supervision by the data processing machine.

A desirable characteristic of a static data storage apparatus is its ability to receive data or to have data read therefrom in parallel form at the same speed as is required for reading a single "bit" therefrom or storing a single "bit" therein.

Accordingly, another object of the present invention is to provide improved means for utilizing the high speed characteristics of a static data storage apparatus in conjunction with a plurality of slow speed data storage devices.

Another object is to provide improved means for effecting compatibility between a plurality of slow speed serially operating devices and a high speed parallel operating device.

Another object of the present invention is to provide improved means for enabling a plurality of slow speed data storage devices to operate at full speed and jointly make use of the high speed characteristics of a static data storage device.

One problem associated with making efficient use of a static data storage apparatus is that of addressing several locations within the static data storage apparatus in a succession so timed that the maximum speed of the static data storage apparatus is utilized. For example, when a plurality of slow speed data storage devices are employed in conjunction with a static data storage apparatus, it is often desirable to transfer data to the static data storage apparatus or read data from the static data storage apparatus from or to all the slow speed storage devices. It is thus desirable to cause the slow speed data storage devices to time share the high speed static data storage apparatus. To do this, several positions in the high speed data storage apparatus are addressed in succession compatible with the high speed of operation of the static data storage apparatus and the slower speed of slow speed data storage devices.

Accordingly, another object of the present invention is to provide improved means for addressing a static data storage apparatus.

Another object of the present invention is to provide improved means for addressing a plurality of locations in a static data storage apparatus in succession.

Another object of the present invention is to provide improved means for addressing several storage locations in a static data storage apparatus in accordance with the demands of several slow speed data storage devices.

Another object of the present invention is to provide improved means for effecting the transfer of data to or from a group of addressable positions of a static data storage apparatus.

Another object of the present invention is to provide means for addressing a plurality of groups of addressable positions in a static data storage apparatus in a timed sequence whereby the minimum amount of supervision is required from the data processing machine.

Another object of the present invention is to provide improved means for alternately placing data from a plurality of addressable positions within a static data storage apparatus onto a single channel to be transmitted to a plurality of slow speed storage devices.

It is often desirable to transfer data from one addressable position in a static data storage apparatus to another addressable position therein. In order to make full use of the speed provided by static data storage apparatus, parallel operation is timewise most efficient. However, there has been one drawback to transferring data between positions in this manner, namely expensive equipment has been required to check the validity of the data transmitted between two such positions. A serial system affords means for economically checking the data transmitted, in that only a single validity checking device is required to check all the data transmitted.

Accordingly, another object of the present invention is to provide improved means for checking the validity of information transferred in parallel between two positions in a static data storage device.

Another object of the present invention is to provide improved apparatus for checking the transfer of data between positions in a static data storage apparatus.

Another more particular object of the present invention is to provide improved means for checking the transfer of data between two positions in a static data storage apparatus at the same time that the data storage apparatus is operating in conjunction with a plurality of slow speed storage devices.

With the data processing machine of the type described in the above-identified copending application, only a single data address is provided with a single operation code. Thus, a problem exists as to how to transfer information between two addressable locations within the data processing system. This problem is especially acute where a transfer of a block of data from a first plurality of addressable positions to a second plurality of addressable positions is required.

Accordingly, it is an object of the present invention to provide means associated with a static data storage apparatus for controlling the start and stop of transfers of information to and from the static data storage apparatus.

A more particular object of the present invention is to provide improved means for sequentially addressing positions in a static storage device between a starting and a stopping position.

Another object of the present invention is to provide improved means for effecting the start and stop of a ring adapted for addressing a static storage device.

Another object of the present invention is to provide improved means for addressing a static data storage apparatus at a plurality of locations while providing economy in the structure utilized.

Frequently in the operation of data processing machines and associated storage devices, an error or some other condition occurs that interrupts the operation of the machine. Under these conditions, it is often desirable to store data comprehending the then existing condition of storage addressing means.

Accordingly, it is another object of the present invention to provide improved means for storing data comprehending the setting of addressing means associated with a static data storage apparatus.

A more particular object of the present invention is to provide means for entering into storage data comprehending the setting of a ring.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a general block diagram of data flow paths in a static data storage system embodying the present invention.

FIGS. 2*a* through 2*d* taken together constitute a more detailed block diagram of a static data storage system embodying the present invention.

Figure 2A:
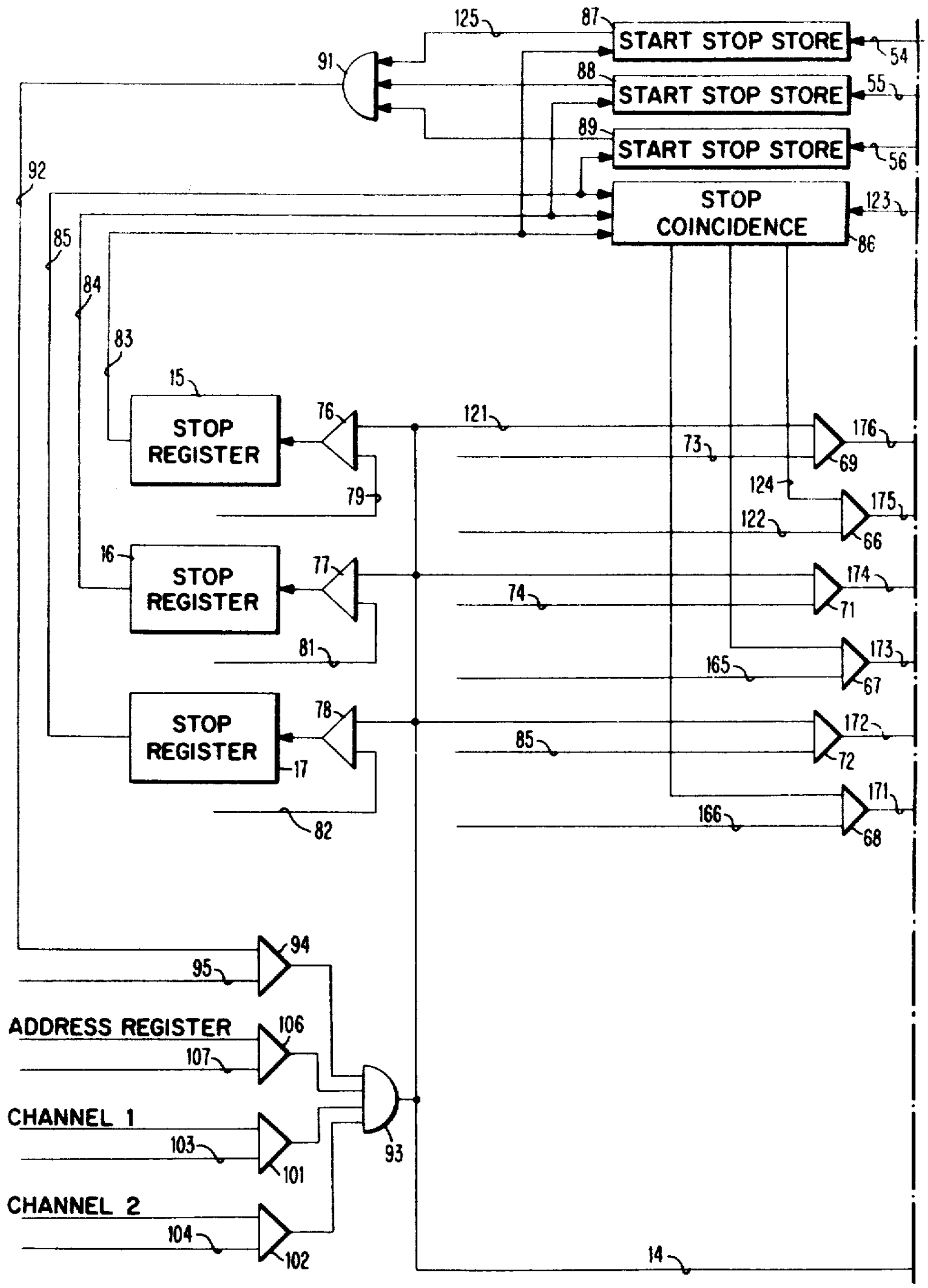
Figure 2B:
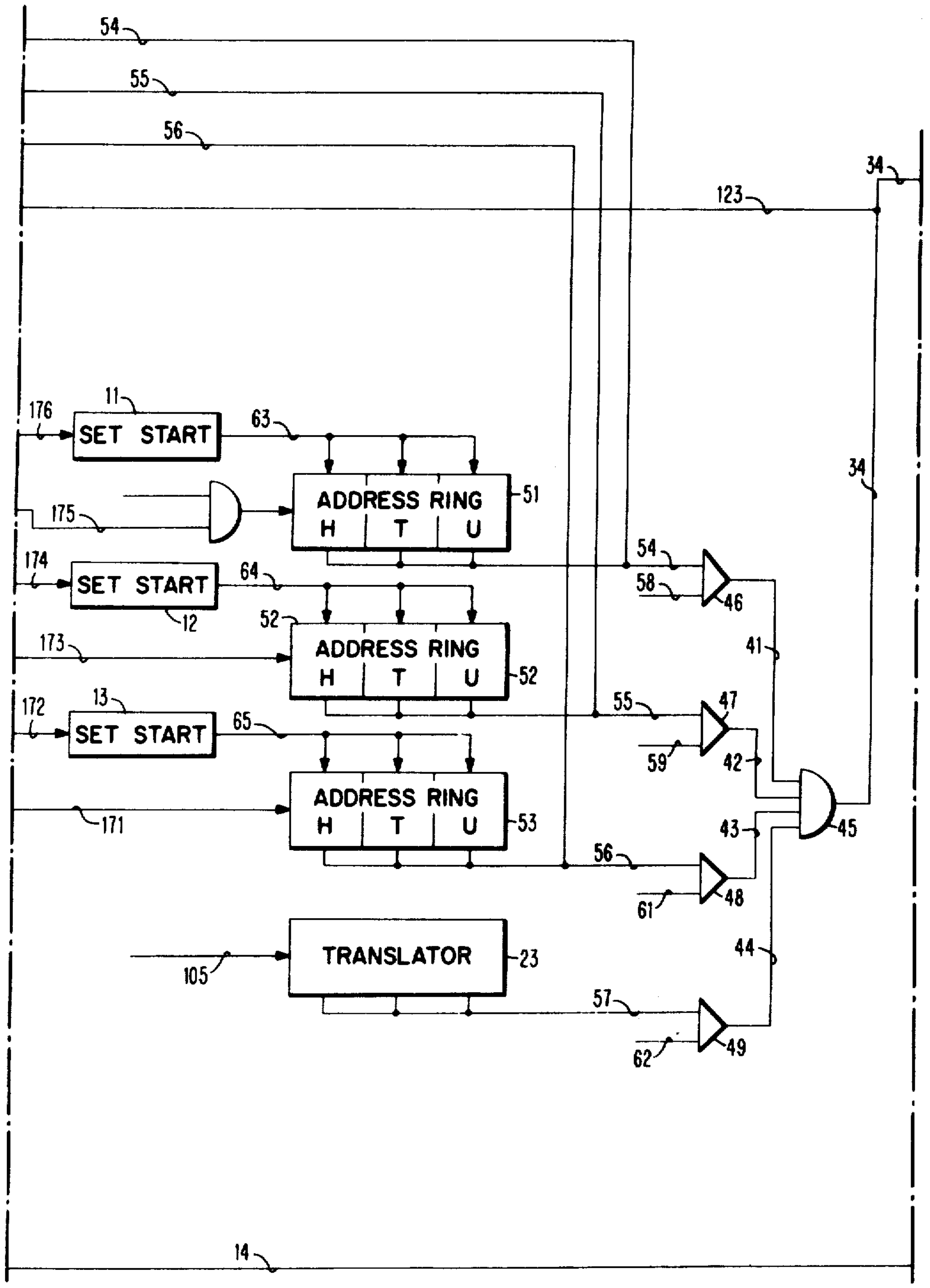
Figure 2C:
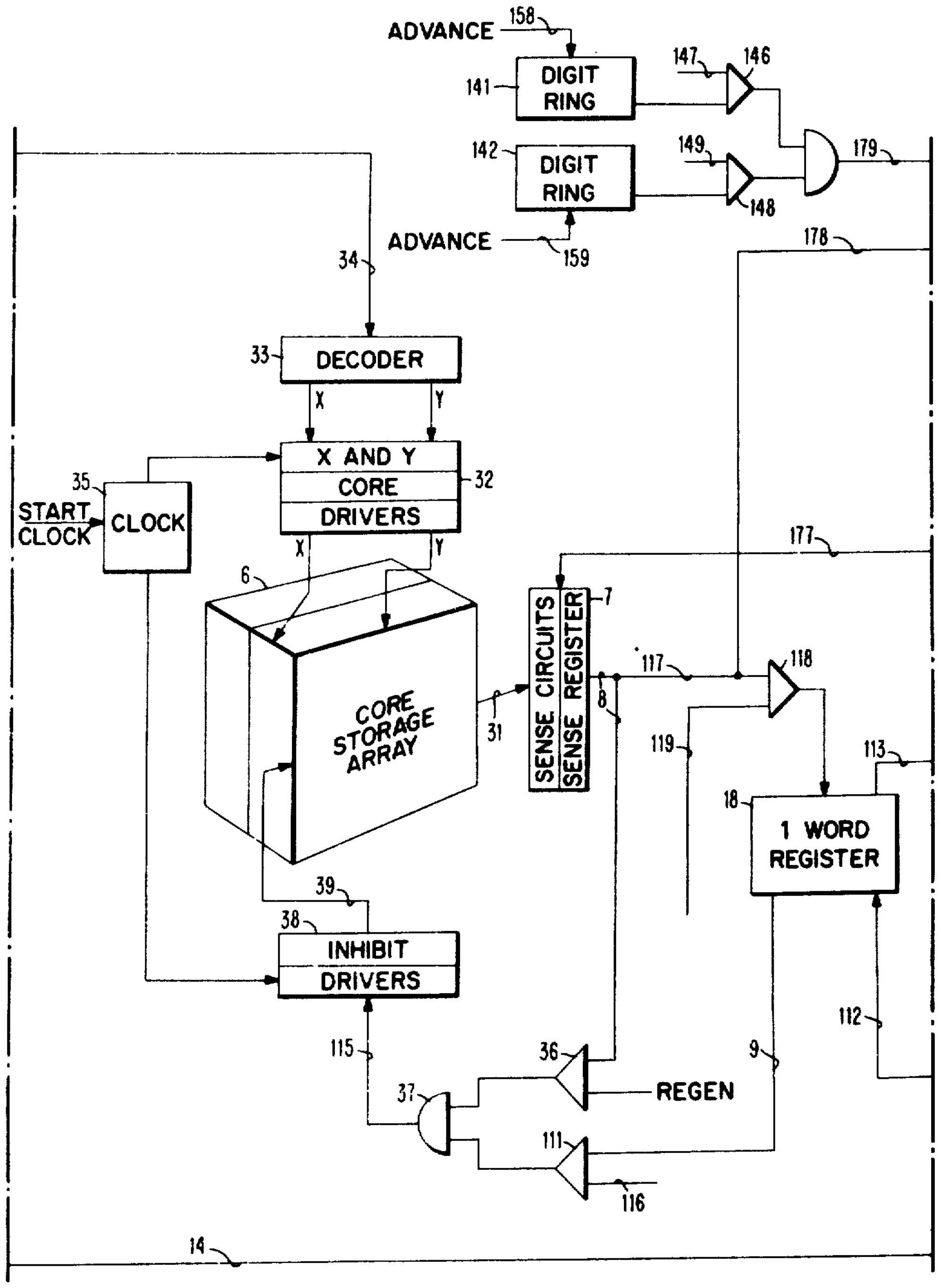
Figure 2D:
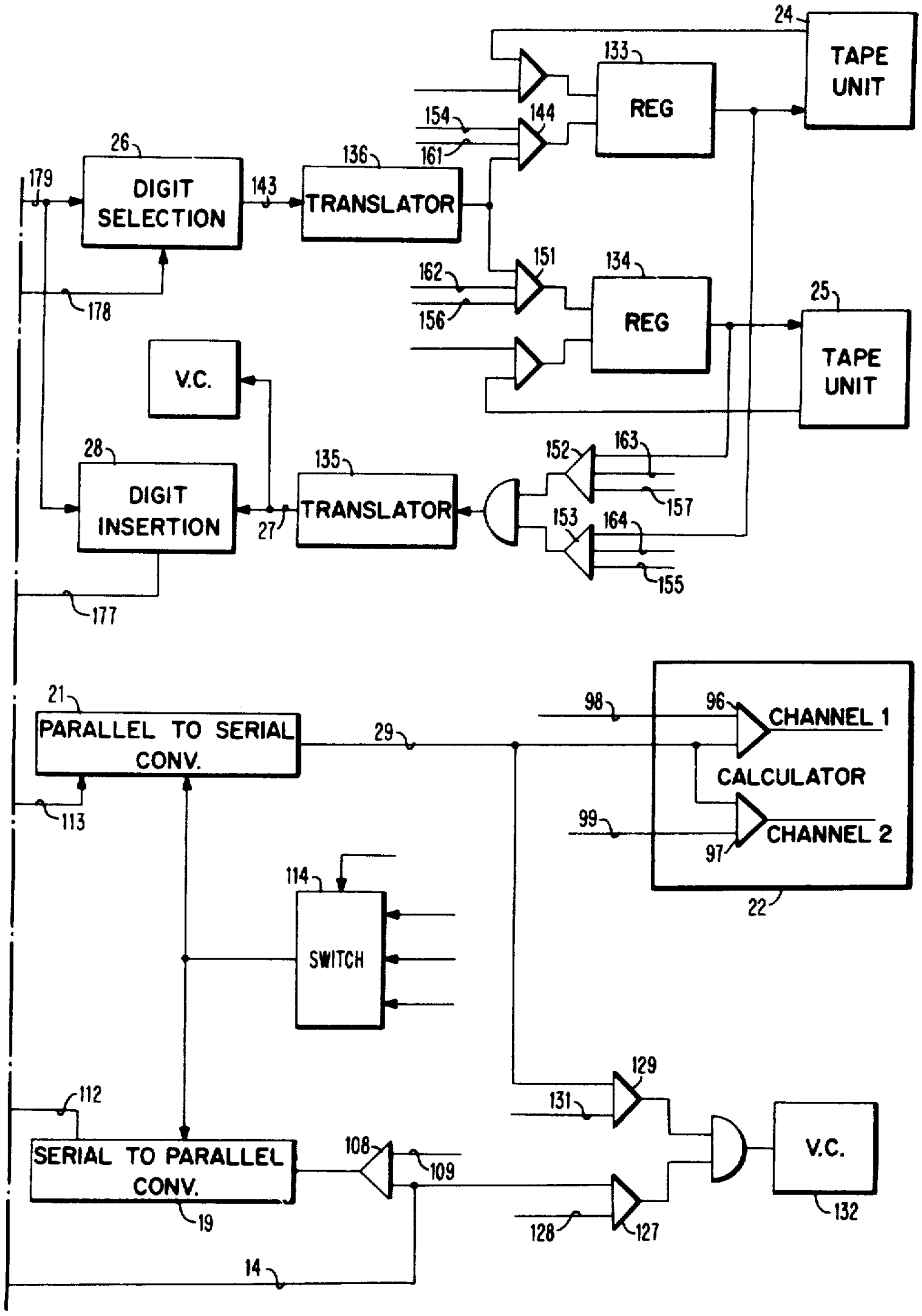
Figure 3:
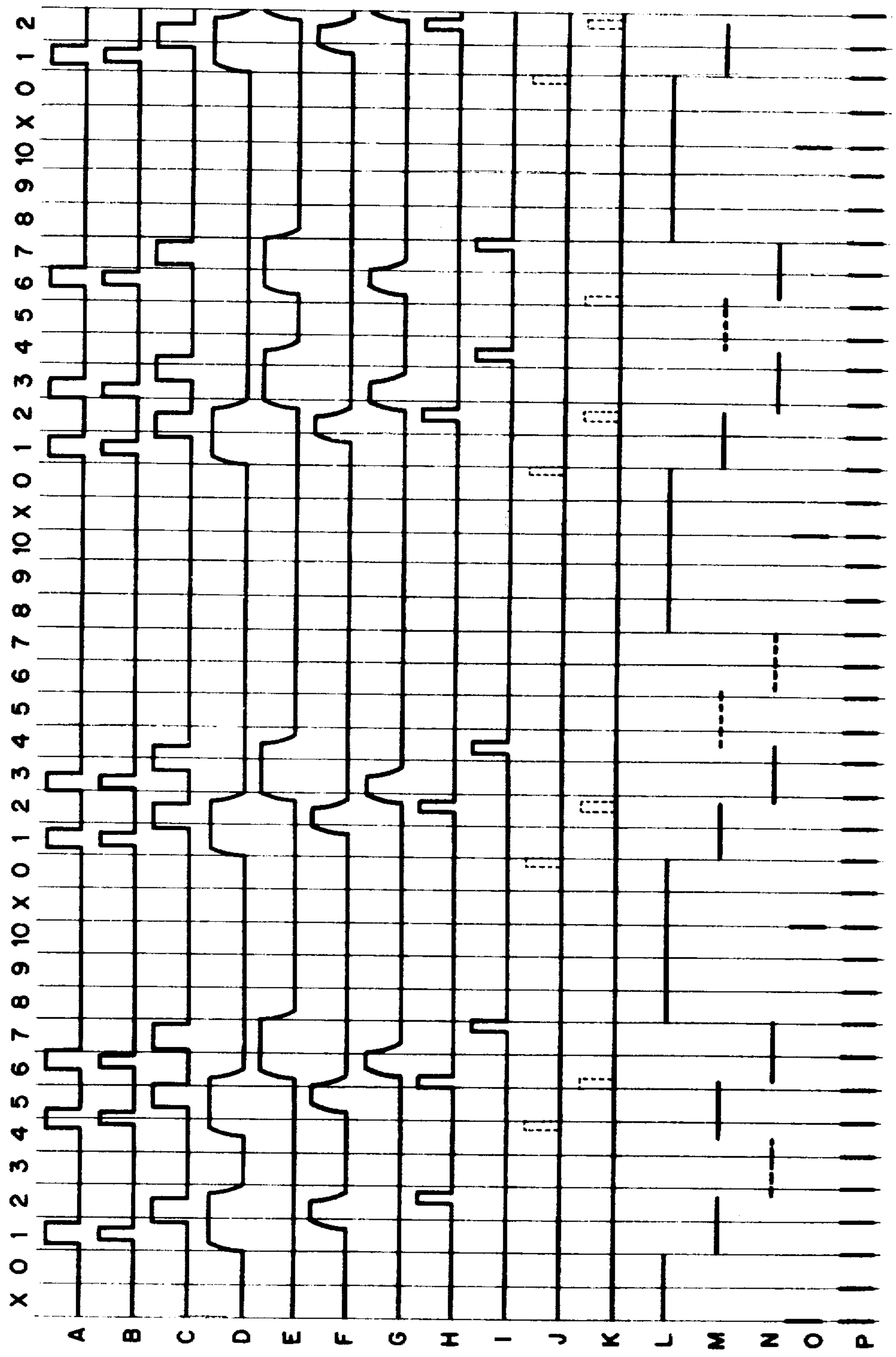

FIG. 3 is a diagram of several time vs. voltage waveforms to a common time base appearing at points in FIGS. 2*a* through 2*d*.

Referring first to FIG. 1, there is shown a static data storage system including a magnetic core data storage array 6 of the well-known type provided with sense circuits and a sense register 7. The sense register 7 receives the data sensed in the core array 6 and temporarily stores the same. Data sensed in the cores and transferred to the sense register may be regenerated in the cores over the channel indicated at 8. Other data may be entered into the core storage array over the channel indicated at 9. The core storage array is arbitrarily broken up into word positions. Each word position is addressable and includes sufficient core elements to store a plurality of characters of data. The present core array is said to be operated in a parallel manner since an entire word of data is transferred to or from the core array in parallel. That is, all the characters going to make up a word are simultaneously transmitted over a plurality of wires. Since a word in the present core array is comprised of eleven characters of five elements each, the channels designated 8 and 9 are each made up of five times eleven or fifty-five wires. In order to enter data into or read data out of the core array, the cores making up the word must all be energized simultaneously for the parallel type operation.

A plurality of means for addressing the core array are shown. These means comprise address rings 51, 52 and 53 and associated switching circuitry. Each of the rings 51, 52 and 53 may be independently set to any desired position and may thus independently address the core storage array. Associated with each ring is a set start mechanism. The set start mechanism associated with ring 51 is designated 11, that associated with address ring 52 is designated 12 and that associated with address ring 53 is designated 13. The function of the set start mechanisms is to take data appearing on the channel 14 and switch the various elements of this data to set the correct position of a ring in accordance with the data.

Once a ring is set to a given position, the ring will advance from that position in a sequential manner each time an advance pulse is applied thereto. Associated with each ring is also a stop register. Stop register 15 is associated with address ring 51. Stop register 16 is associated with address ring 52, and stop register 17 is associated with address ring 53. The function of the stop registers are to store a number which comprehends the position of its associated ring at which it is desired to stop this associated ring. For example, if it is desired to start address ring 51 at position 25 and stop address ring 51 at position 40, the ring is initially set at position 25 by set start mechanism 11 and will be advanced until it reaches position 40 at which position it will be stopped by virtue of the fact that a 40 is stored in stop register 15.

Address rings 51, 52 and 53 are selectively switched to address the core storage array 6. That is, address ring 51 will first address the core storage array 6 and, in a next interval of time, address ring 52 will address the core storage array.

A word in the core storage array addressed by one of the address rings will be read out in parallel to the sense register 7, and may be read back into the core storage array in parallel over channel 8.

In addition to the sense register, a one word register 18 is provided which may receive a word of data transmitted in parallel form from the sense register 7 or from an outside source through the serial-to-parallel translator 19.

The one word register may supply information to core storage over channel 9 or the one word register may supply information to the parallel-to-serial converter 21 to be transmitted to calculator 22.

A transfer of data within the core storage array is effected by reading a word of data out to the sense register, thence to the one word register, and from the one word register back to the desired location in the core storage array. The addressing of the core storage array under this condition will be under control of ring 51 and translator 23. Translator 23 receives information at its input from the address register of the data processing machine shown as calculator 22. This data processing machine may be of the type shown in the above-identified Hamilton et al. copending application. While the data stands in the one word register, a validity check may be performed thereon. This validity check is performed in the following manner: The data from the one word register is transmitted to the parallel-to-serial converter 21 and from the parallel-to-serial converter 21 is transmitted serially to a validity check mechanism. Once the validity check on this data standing in the one word register has been completed, the data may then be transferred over channel 9 back to the desired addressable position of the core storage array. It may be noted from FIG. 1 that all transfers of data from cores to the calculator and from the calculator to the cores are by way of the one word register.

In addition to the calculator 22, tape units 24 and 25 are shown. These are of the well-known construction and are hereafter referred to as slow speed data storage devices. In order to transfer information from the tapes to the cores, and to transfer data from the cores to the tapes, the following operation is performed: In a transfer of a word from core storage to tape unit 24 and a concurrent transfer of a word from a different position in core storage to tape unit 25, the following routine is gone through: First, a word from core storage is transferred to the sense register under control of address ring 52. In a following time interval a single character from the sense register 7 is selected by digit selection circuit 26 and transferred to tape unit 24. The data in the sense register is then transferred back to its original location in the core storage array. The word designated by addressing ring 53 is next transferred from core storage to sense register 7. Following this, the particular character of the word now standing in sense register 7 designated by the digit selection circuit is transferred to tape unit 25. After this transfer, the word standing in the sense register transferred back to the core storage array over channel 8. The above sequence of operations is repeated until the desired information is transferred.

If it is desired to transfer information from tape units 24 and 25 to the core storage array, then the operation is the reverse of that just described. That is, the information coming serially from tape units 24 and 25 over channel 27 is fed to the digit insert mechanism 28 which mechanism 28 selects a particular position of the sense register 7 and supplies the character thereto. After a character is supplied to the sense register 7, the entire contents of the sense register 7 are transferred in parallel over channel 8 to the core storage array at the position designated by address ring 52. Next, the character from tape unit 25, for example, is fed over channel 27 to the digit insertion mechanism 28 and the particular position of the sense register 7 selected by the mechanism 28 receives the character transmitted fromt ape unit 25, after which the entire contents of the sense register are transferrred to the core storage array at the position designated by address ring 53. The transfer of information from tape unit 24 to the core array is under control of address ring 52 and that from tape unit 25 is under control of address ring 53. For the next character to be inserted from tape unit 24, the word in the core storage array designated by ring 52 is read out to the sense register 7 and the digit insertion mechanism 28 selects another position of sense register 7 at which this character from tape unit 24 will be inserted. The entire word in sense register 7 is again transferred back to core storage 6 and the process is repeated until an entire word has been transferred from tape units 24 and 25 to the core storage array 6. Upon the transfer of a complete word from tape unit 24 to the core storage array 6, address ring 52 will advance one position to address the next suceeding word in core storage if this is the place where it is desired to store the next word. In a block transfer of information from tape unit 24 to the core storage array 6, the core storage array is addressed at successive word positions so that the address ring 52 is simply advanced from one position to the next position to address successive words at which the information from tape unit 24 is stored. The same type of operation is performed with tape unit 25. If it is desired to transfer data from the calculator to the core storage or from the core storage array to the calculator at the same time that data is being transferred from tape units 24 and 25 to the core storage array, the operation of the transfer of information from tapes 24 and 25 to the core storage array remains the same as just described. In a time sequence with the transfer of information from the tape units to the calculator a time interval is allotted for transfer to the calculator. Such a transfer is by way of the word register. For example, when transferring a word of data from core storage to the calculator, the address ring 51 will address the word in core storage to be transferred while the address register of the calculator will designate where in the calculator this word is to be stored. The entire word is then transferred in parallel from the core storage array to the sense register and from the sense register to the one word register 18. From the one word register 18 the data is taken through parallel-to-serial converter 21 over channel 29 to the calculator. The operation of the parallel-to-serial converter is as follows: First, the parallel-to-serial converter will activate the lowest ordered position in the one word register and transfer the character found there over channel 29 to the calculator. Next, the parallel-to-serial converter will activate the next higher ordered position in the one word register and transfer the character found there over channel 29 to the calculator, and so on until the entire word has been transmitted over channel 29 in serial form to the calculator. The operation for transferring data from the calculator to the core storage array is the reverse of the above. First, the data coming from the calculator is fed to the serial-to-parallel converter 19. This serial-to-parallel converter 19 performs the function of successively activating the positions of the one word register and allowing the serial data flowing to the serial-to-parallel converter to enter the proper positions of the one word register. Once the one word register has been filed, the word standing therein is transmitted in parallel over channel 9 to the core storage array. This transfer to the core storage array 6 is again under control of ring 51. If it is desired to transfer a group of words from the calculator to the core storage array 6 or to transfer a group of words from the core storage array 6 to the calculator, then address ring 51 is simply advanced from one position to the next in succession until a stop position is reached. The ring starts from the start position initially set up by start mechanism 11.

In addition to the above-described operations, the apparatus of the present invention also performs the operation of storing data comprehending the setting of any of the address rings 51, 52 or 53, and therewith the data stored in the corresponding stop registers 15, 16 and 17.

Referring now to the more detailed block diagram illustration of the present invention at FIGS. 2*a* through 2*d*, a more detailed description will be given.

Referring first to FIG. 2*c*, a magnetic core storage array is shown. This core storage array comprises 1,000 words of core storage. Each word is made up of 11 characters, and each character is represented in a 2 out of 5 code; thus there are $5 \times 11 \times 1000$ cores in this array. As is well known in the art, a bit of information may be stored in a magnetic core by placing the core in one of its two stable states of remnant magnetization. A core is placed in such a state by simultaneously energizing two wires passing therethrough, each with one half the current needed to drive the core to saturation. A core so placed in a predetermined state of remnant magnetization is said to have a "bit" stored therein. In order to read this "bit" out of the core, current is passed through the two driving lines in the opposite direction to switch the core to the opposite state of remnant magnetization. If the core is standing in a first state of remnant magnetization, then a pulse will be produced on a sense line passing through this core as the core is switched from the first remnant magnetic state to the opposite state. A core having a "bit" of information stored therein and read therefrom must have the information regenerated therein in order to retain the information. The regeneration of information in cores is the normal function of a sense register. For a single core or for a single row of cores being serially read out of, only a single storage device is necessary for this purpose. The sense register 7 in the present system consists of 55 binary storage elements. These binary storage elements may be of the latch type as shown and described in Hughes Patent Number 2,628,309. The present system utilizes a three-dimensional core array. In operating a three-dimensional core array, X and Y coordinate drivers are provided. These coordinate drivers are lines that have supplied thereon the above mentioned half-drive currents. A three-dimensional array requires inhibit drivers in addition to the X and Y coordinate drivers. The operation of inhibit drivers are well known in the art, and briefly, are lines that pass through the cores and have supplied therethrough current in such a direction as will oppose the driving forces of the X and Y coordinate drivers. Thus, if it is desired not to switch a particular core when addressed by the X and Y coordinate drivers, the associated inhibit drivers have an opposite current flowing therein to prevent the switching. The inhibit drivers are used only when it is desired to store information in the cores since the cores of a word are all driven to the same state of remnant magnetization when data is read therefrom. When regeneration takes place, the sense latches of sense register 7 will energize the inhibit drivers in such a way as to switch only the desired cores. The use of inhibit drivers is well known in the art and is shown for example in U.S. Patent No. 2,691,154.

Various other elements employed throughout the present system such as "and" and "or" circuits are well known and are fully described in the above-mentioned Hamilton et al. application, Serial No. 544,520.

Associated with the magnetic core storage array 6 are 55 sense lines represented as channel 31. Each sense line passes through every word in the core storage array and through the corresponding core of each word. Thus, there are 55 sense lines in order to accommodate a plurality of words of 11 characters each in the 2 out of 5 code. It should be noted that for simplicity throughout FIGS. 2*a* through 2*d* a single line is used to represent a plurality of lines.

A sense circuit is associated with each sense line. The sense circuit is an amplifying and timing means that shapes and accurately times the pulse from the sense line and feeds them to the sense register.

In order to address a particular word in the core storage array 6, it is necessary to select the proper X and Y coordinate driving lines. If it is desired to store information in the core storage array, the current is passed through these X and Y lines in one direction; and if it is desired to read information from the core storage array, current is passed in these X and Y coordinate lines in the opposite direction. In the present 1,000 word storage array, there are 50 X coordinate lines and 20 Y coordinate lines. To select any word in this core storage array, it is only necessary to select one of the 20 Y coordinate lines and one of the 50 X coordinate lines.

X and Y switch core drivers 32 are provided to produce the necessarily shaped and timed pulses for driving the core array 6. These drivers may be of the well known switch core type and controlled to provide current pulses of the polarity required to read or write as desired.

If the 1,000 words in the core storage array are arbitrarily designated as words 0 through 999, a three digit number may represent the address of any word in the core storage array. Channel 34 is comprised of thirty separate wires for supplying a three digit coded decimal number to a decoder 33. The address of a word in the core storage array may thus be present on channel 34 in parallel form and acts with the decoder 33 to select an address position in the core storage array 6.

The decoder 33 consists of a plurality of switching and mixing circuits whereby the 30 input lines of channel 34 are selectively switched to select the proper X and the proper Y coordinate driving line to drive the correct word in the core storage array 6. Such diode switching networks are well known in the art and no further description is believed necessary here.

To effect a readout of a word from the storage array to the sense latches of register 7, a three digit number is necessary on channel 34. This three digit number is decoded by decoder 33 and supplied to the X and Y switch core drivers 32 to drive the appropriate X and Y coordinate drivers. In order that the X and Y coordinate drivers may be driven at the proper time to read out the information in step with the rest of the system, a clock 35 is provided. An output, A, FIG. 3, from clock 35 is switched with the outputs of the decoder 33 to drive the proper X and Y coordinate lines at the proper time. The timing pulses supplied by clock 35, in relation to the other control signals of the system, may be seen at FIG. 3 as waveforms A, B and C. With the signal from the clock 35 and the signals from the decoder 33, the X and Y coordinate lines will be driven at the proper time and a word of information will be read out of the core storage array 6 on the sense lines 31 to the sense register 7 and temporarily stored therein. From the sense register 7, the data may be transferred to another part of the system as will hereafter appear. Once the data from sense register 7 has been transmitted as desired to some other part of the system, the data may then be regenerated in the core storage array. This regeneration will be accomplished by the use of channel 8 which channel 8 includes 55 lines, one for each of the storage devices of register 7. These 55 lines of channel 8 are switched at switch 36 with a signal indicating that a regeneration of the information is required. The data from the 55 "and" circuits that make up switch 36 are fed to 55 "or" circuits indicated as mix 37 and from these "or" circuits to inhibit drivers 38. A pulse, C, FIG. 3, from clock 35 is also fed to the inhibit drivers 38 in order to properly time the regeneration or storage of the data in core storage array 6. Since there are 55 lines coming into the inhibit drivers 33, there are 55 inhibit drivers and 55 lines from these inhibit drivers to the core storage array. These latter 55 lines are indicated as channel 39. Simultaneously with the pulsing of the inhibit lines of channel 39, the clock also supplies a pulse to the X and Y core drivers to cause these core drivers to send current pulses through the correct X and Y coordinate lines as selected by decoder 33 of the proper polarity to regenerate the data from the sense latches in the core storage array.

It might be pointed out at this time that data supplied to the core array from an external source are brought in through the inhibit drivers in the exact same manner that the data from the sense latches are brought through these inhibit drivers for regeneration. The only difference between regenerating data from the sense latches 7 and the introduction of new data into the core storage array is the channels to the inhibit drivers 38 over which this information flows. It is believed that with the above description the operation of the core storage array and its driving circuitry may be clearly understood.

Referring now more particularly to the addressing means for selecting words within the core storage array 6, four channels 41, 42, 43 and 44 are shown feeding into a plurality of OR circuits represented as mix 45. Each channel 41, 42, 43 and 44 is comprised of thirty parallel lines and thus a total of thirty, four-way OR circuits are represented by the mix 45. With these four channels, mix 45 feeds channel 34 from four different sources. Four switches are provided for these channels 41, 42, 43 and 44, one for each, and designated 46, 47, 48 and 49 respectively. Each of the switches 46, 47, 48 and 49 will, of course, comprise a plurality of thirty individual two-way AND circuits. Switches 46, 47, 48 and 49 are respectively fed by address ring 51, address ring 52, address ring 53, and by translator 23. Ring 51 feeds switch 46 over output channel 54, ring 52 feeds switch 47 over output channel 55, ring 53 feeds switch 48 over output channel 56, and translator 23 feeds switch 49 over channel 57. If it is desired to transmit the data appearing on channel 54 to channel 34, then switch 46 is controlled by control line 58 to transmit the data from channel 54 to channel 34 by way of channel 41 and mix 45. In a similar manner, if it is desired to transmit the data on channel 55 to channel 34, the control line 59 of switch 47 is energized. Likewise, to transmit the data on channel 56 to channel 34, the control lines 61 of switch 48 effect the switching of the data from channel 56 to channel 34. Likewise, if it is desired to transmit the data on channel 57 from translator 23 to channel 34, control line 62 of switch 49 is energized to effect the switching operation.

Rings 51, 52 and 53 are each latch rings of the type shown and described in detail in copending application, Serial No. 403,702 of F. E. Hamilton et al., filed February 8, 1954. These rings 51, 52 and 53 each comprise three ten-position rings designated as U (units), T (tens), and H (hundreds); whereby a complete cycle, namely an advance through ten positions by the units ring will advance the tens ring one position, and a complete cycle of the tens ring will advance the hundreds ring one position. The outputs from all the stages of the units, tens and hundreds rings of ring 51, for example, are taken in parallel to make up the thirty wires of channel 54. These thirty output wires are then capable of representing the numbers 0 through 999. It may thus be said that these thirty wires manifest data comprehending an address position in the core storage array. Each of the rings 51, 52, and 53 is capable of being set to any desired position. That is, the ring is first reset so that all positions are off and then the desired position from which it is desired to start the ring is pulled up so that the latch in that position is on. Thus, there are a plurality of thirty wires coming into each ring to pull the desired position up. The proper ones of these thirty wires to each ring 51, 52 and 53 is energized by the set-start mechanisms 11, 12 and 13, respectively. The channels from the set-start mechanism 11, 12 and 13 are respectively designated as 63, 64 and 65. Each of the rings 51, 52 and 53 is advanced by advance pulses in the same manner as are the rings in the above-identified Hamilton et al. applications. An advanced pulse to advance ring 51 is fed through AND circuit 66, the signal to advance ring 52 is fed through AND circuit 67, and the signal to advance ring 53 is fed through AND circuit 68 to the respective rings. From the above it is seen that the outputs from rings 51, 52 and 53 are taken in coded digital form, and may thus be transmitted as is other data within the system.

It should be noted at this point that the set-start mechanism 11, 12 and 13 each comprise a diode switching arrangement that simply takes input data in the form of a two-out-of-five code and translates this input data into the thirty wire representation of three decimal digits as appears on channels 63, 64 and 65. Thus, the channels coming into set-start mechanism 11, 12 and 13 each comprise a channel of five wires for the serial transmission of characters represented in the two-out-of-five code. The data coming in to activatee set-start mechanisms 11, 12 and 13 are fed through switches 69, 71 and 72 respectively. Again, each switch 69, 71 and 72 is comprised of a plurality of five individual two-way AND circuits. Since the data feeding the switches 69, 71 and 72 are from channel 14, the switches 69, 71 and 72 control which of the start mechanisms 11, 12 or 13 will receive the data from channel 14. The control lines for switches 69, 71 and 72 are designated respectively 73, 74 and 75. It is thus seen that in order to set one of the address rings in a desired position it is only necessary to activate the switch associated with its set-start mechanism at the proper time to pick the desired information off channel 14 to effect the setting of the ring.

Associated with each address ring 51, 52 and 53 is a corresponding stop register 15, 16 and 17, respectively. These stop registers are adapted to store data comprehending a position of the ring at which it is desired to stop the ring. The stop registers 15, 16 and 17 are latch storage devices of the type shown in the above-identified Hamilton et al. application, Serial No. 544,520, at FIGS. 69*a* through 69*e* and FIGS. 71*a* through 71*l*. Stop registers 15, 16 and 17 are each capable of storing a three digit number in the two-out-of-five code, thus each stop register 15, 16 and 17 comprises 15 latch devices. Stop registers 15, 16 and 17 are respectively fed by switches 76, 77 and 78. The switches 76, 77 and 78 are each fed by data from channel 14. Since channel 14 comprises five parallel wires over which data is fed in serial form, the switches 76, 77 and 78 each comprise five individual two-way AND circuits. Control lines 79, 81 and 82 control the flow of data from channel 14 to the respective stop registers. Stop registers 15, 16 and 17 have data entered therein serially as do the registers mentioned in the above-identified copending application of F. E. Hamilton et al., Serial No. 544,520. Thus, if it is desired to enter data into the stop register 15, control line 79 is energized to allow the data to pass from channel 14 through switch 76 to stop register 15. Switch 76 is thus opened at the proper times to allow the three desired characters from channel 14 to enter stop register 15. Stop registers 16 and 17 operate in a like manner.

The stop registers 15, 16 and 17 are effective in the following manner to control the stopping of rings 51, 52 and 53. The parallel outputs in the two-out-of-five code from the stop registers are transmitted over channels 83, 84 and 85, respectively, to a stop coincidence circuit 86. Stop coincidence circuit 86 is also fed by the data appearing on channel 34 and, as it will be remembered, the data appearing on channel 34 is the data comprehending the position at which the ring supplying the data to channel 34 is standing. Channel 34 feeds into stop coincidence circuit 86 with the outputs of stop registers 15, 16 or 17. Stop coincidence circuit 86 is a group of diode switch and mix circuits which compares data on channel 34 with data on channel 83, 84 or 85 to produce an output when coincidence exists between the data coming in on channel 34 and the data supplied by the one active channel 83, 84 or 85 from a stop register 15, 16 or 17. The channels 83, 84 and 85 are selectively switched at the same time that channels 54, 55 and 56 are switched to channel 34. The outputs of stop concidence circuit 86 are normally positive signals that are fed to the AND circuits 66, 67 and 68 to allow the advance pulses to go through these AND circuits to advance the respective rings 51, 52 and 53. When a coincidence occurs between the data on channel 34 and the data on one of the channels 83, 84 or 85, the normally positive signal from this stop coincidence circuit to the corresponding AND circuit 66, 67 or 68 is removed and no further advance signals are allowed to go through to advance the corresponding ring. Thus, the ring is stopped at the position indicated by the numbers standing in the corresponding stop register.

Data appearing on channel 14 is passed to a validity check circuit 132, FIG. 2*d*, in order to determine that a word is complete and that each digit or character thereof is a valid character. When it is desired to store a start address of a ring 51, 52 or 53 and the corresponding stop address appearing in the stop registers 15, 16 or 17, then it is necessary to build a complete eleven digit word in order to pass the validity check. For this purpose, start-stop storage mechanisms 86, 87 and 88 are provided. Each of these start-stop storage mechanism 86, 87 and 88 perform two functions: (1) These mechanisms insert valid characters in the unoccupied positions of a word carrying the data comprehending the setting of a ring and the stop address from a stop register. The manner in which characters may be inserted into a data channel is shown and described in the above-identified application of F. E. Hamilton et al., Serial No. 544,520. (2) The start-stop storage mechanisms 86, 87 and 88 each selectively switch the outputs from the units, tens and hundreds positions of the address rings in sequence to mix 91 and also switch the outputs from the stop registers in a timed sequence to mix 91 which mix 91 in turn feeds information over channel 92, through switch 94, and through mix 93 to channel 14. Thus, the functions of the start-stop storage mechanisms 87, 88 and 89 are to assemble a word suitable for storage from the outputs of rings 51, 52 and 53 and the outputs from stop registers 15, 16 and 17 and transmit this word through mix 91 over channel 92 to switch 94 where this word may be fed to channel 14.

With the above understanding of how the addressing mechanism for the core storage array operates to provide addressing of a plurality of positions in the core storage array, we may now proceed to the description of how a plurality of slow speed storage devices are operated in a compatible way with the high speed static data storage apparatus just described. By way of example, three slow speed data storage devices are shown in FIG. 2*d*. These three slow speed devices are indicated as tape units 24 and 25 and a calculator 22. The calculator 22 has a magnetic drum as its primary storage device.

The calculator 22 has a pair of data transmitting channels associated therewith. Data is fed from the core storage mechanism to the calculator over channel 29 and is placed on either channel 1 or channel 2 of the calculator depending on whether switch 96 or switch 97 is energized. The control line for switch 96 is indicated at 98 while the control line for switch 97 is indicated at 99. Thus, if it is desired to place the information from channel 29 on channel 1 of the calculator 22, control line 98 is energized to allow the data from channel 29 to flow through switch 96 into channel 1 of the calculator. If it is desired to feed data from the calculator 22 to channel 14 of the storage system above described, then depending on whether the data is coming from channel 1 or channel 2, either switch 101 or switch 102 shown at FIG. 2*a* is energized. The calculator channel 1 is fed to switch 101. Control line 103, when energized, will switch the data from channel 1 of the calculator through switch 101 to mix 93 and from mix 93 to channel 14. The energization of control line 104 will allow data present on channel 2 of the calculator 22 to pass through switch 102 to mix 93 and from mix 93 to channel 14.

As mentioned above, the calculator 22 is of the type generally shown in the above-identified Hamilton et al. application, Serial No. 544,520. It will be recalled that this calculator 22 has what is known as an address register, the operation of which is thoroughly described in the above-identified application. This address register has the function of selecting the address of the word to be utilized by the calculator 22. This address register is connected at two places in the present storage system. First, as mentioned earlier, it is connected to the two-out-of-five to decimal translator 23 by channel 105 for directly addressing the core storage array. The flow of data is from the address register over channel 105, through the two-out-of-five to decimal translator 23 over channel 57 through switch 49, through mix 45, over channel 34 to decoder 33, to select the desired word from core storage array 6. The other connection to the present apparatus is through switch 106. The control line 107 when energized allows data from the address register to flow through switch 106 and through mix 93, and from mix 93 to channel 14. After the data is placed on channel 14, it may be fed to control any of the address rings 51, 52 and 53. Data on channel 14 can also be entered into the core storage array through switch 108, FIG. 2*d*. Control line 109 controls the pasage of data through switch 108. Thus, when control line 109 is energized, the data on channel 14 passes through switch 108 to the serial-to-parallel converter 19 from which it is fed to one word register 18 and thence into the core storage array as will be described in slightly more detail hereafter.

The one word register 18 is a latch register of the general type mentioned above as shown in the copending Hamilton et al. application, Serial No. 544,520, at FIGS. 69*a* through 69*e* and at FIGS. 71*a* through 71*l*. Since this one word register must store 11 characters in a two-out-of-five code, fifty-five individual latch circuits are provided. The outputs from the one word register may be taken over channel 9. Channel 9 consists of fifty-five parallel wires over which all of the data from the one word register may simultaneously pass, that is, in parallel, to the switch 111. The serial-to-parallel converter 19, through which data passes from channel 14 to the one word register, is a diode switch arrangement which will switch the successive positions of the one word register to receive data from channel 14. That is, serial-to-parallel converter 19 will first connect the lowest ordered position of the one word register to receive a character from channel 14. After the character appearing first on channel 14 has been stored in the lowest ordered position of the one word register, serial-to-parallel converter 19 will then connect to the next lowest ordered position of the one word register to receive the next character appearing on channel 14. The serial-to-parallel converter 19 steps along in this manner until the entire 11 positions of the one word register are filled. Serial-to-parallel converters are well-known in the art and no further description is believed required here.

Another channel 113 from the outputs of the one word register 18 is provided to feed parallel-to-serial converter 21. The function of parallel-to-serial converter 21 is exactly the reverse of the function of the serial-to-parallel converter 19. That is, the parallel-to-serial converter 21 will successively switch successive orders or positions of the one word register to the channel 29. Channel 29 is a five wire channel for transmitting characters in the two-out-of-five code in a serial manner. Thus, the parallel-to-serial converter 21 will first switch the lowest ordered position of the one word register to channel 29 and after the data has been read out from this lowest ordered position to channel 29, the parallel-to-serial converter will switch the next lowest order position of the one word register to channel 29. This process continues until an entire word has been read from the one word register 18 to channel 29.

In a data processing system of the type incorporating the present storage system, the data appears "on time" or "early" as required to accommodate the storage device to which it is going. Certain storage devices such as magnetic drums require time for a read or record circuit to become active after having become energized. Thus, data to be recorded on the drum must be presented at one character time early in order to be recorded on time. For this reason, a switch 114 is provided to accommodate the data that may appear "early" or "on time" on channel 14, or to supply data from the parallel-to-serial converter 21 to the channel 29 either "on time" or "early" depending on what use is to be made of the data. The above-identified application of F. E. Hamilton et al. Serial No. 544,520, describes the use and control of "early" and "on time" data. The switch 114 therefore controls the parallel-to-serial converter 21 and the serial-to-parallel converter 19 to cause the data to be read from the one word register either "on time" or "early" depending on where the data from the one word register is going in the calculator or depending on the condition of the data appearing on channel 14 going to the one word register. Switch 114 will insure that the data coming into the one word register will be placed therein in its proper positions. Switch 114 will also insure that the data coming from the one word register appears on the channel 29 at the proper time to be made use of by the calculator 22. Functionally then, switch 114 simply controls the time at which the read in to the one word register starts or the time read out from the one word register starts. After the read-in to or the readout from the one word register has started, the serial-to-parallel converters function as described above.

Returning now to the one word register and its cooperation with the core storage array, it is seen that the data coming from the one word register over channel 9 is fed through switch 111 to mix 37 and from mix 37 over channel 115 to the inhibit driving circuit 8. Control line 116 when energized will allow the data from channel 9 to pass through switch 111 and through mix 37 to channel 115 and to the inhibit driving circuits 38. The manner in which the data is transferred from mix 37 into the core storage array was described above in connection with the description of the core storage array itself. Thus, data coming through switch 111 is treated in the same manner as data coming through switch 36 once it has arrived at mix 37.

The data appearing in the sense registers 7 and appearing on the 55 wire channel 8 is also fed over channel 117 through switch 118 to the one word register. Switch 118, of course, comprises 55 individual two-way AND circuits. When control line 119 of switch 118 is energized, data appearing on channel 117 will be fed into the one word register and be stored therein. The data from switch 118 is fed in a parallel manner; that is, over a 55 wire channel simultaneously to set up latches in the one word register simultaneously.

By way of example to illustrate the operation of the present system, let us assume that it is desired to transfer words 38 through 45 standing in the core storage array from core storage to the drum storage of calculator 22. The timing controls operating to perform this operation are supplied by the clock 35 and by the calculator 22. These timing controls are indicated in FIG. 3. In the first interval of time under consideration, data indicating the start position from which data is to be transferred from the cores, namely word 38, will be fed through switch 102, FIG. 2*a*, from the calculator 22 by the energization of control line 104, through mix 93 to channel 14. From channel 14 this data, namely 038, will be transferred by switch 69 from channel 121. The energization of control line 73 will allow this data from channel 14 to pass over channel 121 through switch 69 to set start mechanism 11. Set start mechanism 11 will thus energize the number 8 wire in the units position of the transmission channel 63, the number 3 wire in the tens position, and the zero wire in the hundreds position to set the units position of ring 51 to 8, the tens position to 3, and the hundreds position to zero. With ring 51 set in this manner, channel 54 is ready to carry this information through switch 46 under control of line 58 to mix 45 from which channel 34 will carry the data to the decoder 33, and set up, as previously described, the X and Y coordinate driving lines to read out word 38 from the core storage array 6. It should be noted that when ring 51 is so set up, the ring does not then immediately address the core storage array 6, but does this at a later time under timing controls as shown at A in FIG. 3. Next in time sequence, after the setting of ring 51, stop register 15 is set by data appearing at switch 102. Thus, switch 102 first passes the data indicating the position at which ring 51 is to be set, and following this in time sequence will appear the data indicating the position at which the ring is to be stopped. The position at which the ring is to be stopped is 45 and in timed sequence, switch 76 is opened by the energization of line 79 to allow the data indicating 45 to pass through switch 76 to the stop register 15. This transfer is in serial fashion over channel 14 and thus the three character positions of the stop register 15 are set up in sequence. Once stop register 15 is set up to represent 045, the output of the address ring 51 may be made active to address the core storage array 6. This is under control of switch 46 and the clock 35. First, the word standing at the address position 038 will be read out of the core storage array to the sense register 7 as previously described, from the sense register 7 over channels 8 and 117 through switch 118 under control line 119 to the one word register. The word from address position 038 now standing in the one word register 18 is passed through the parallel-to-serial converter 121 and to channel 29 over which channel the data is passed as desired through either switch 96 or switch 97 to channel 1 or channel 2 respectively, of the calculator 22. Once this serial transfer over channel 29 has been completed, the circuitry is ready for the next word core storage array 6 to be fed to the calculator. It may be noted at this time that the address register of the calculator 22 is effective to address the positions in the drum storage to which it is desired to feed the data from the core storage array. Upon the completion of the transfer of the word from the one word register 18 to the drum storage of the calculator 22, the address ring 51 is advanced one position to place the characters 039 on channel 54. The advance pulse for advancing ring 51 is fed over line 122 through AND circuit 66 which AND circuit 66 is under the control of stop coincident circuit 86. The characters 039 are also fed over channel 123 by way of switch 46 and mix 45 to the stop coincident circuit 86. At the same time, the outputs of the stop register 15 are fed over channel 83 to the stop coincident circuit 86. Since the 039 from the ring 51 does not correspond to the 045 standing in the stop register 15, then the stop coincidence circuit 86 is not activated to cut off advance pulses on line 122 at switch 66 from ring 51. As ring 51 advances to position 039, word 039 from the core storage array 6 is transferred as before to the calculator 22, and the ring is again advanced. This process continues until ring 51 reaches position 045 at which time coincidence will occur at coincidence circuit 86 and the line 124 from coincidence circuit 86 will have its positive potential removed to close switch 66 and prevent any further advance pulses reaching ring 51. At this time, the transfer of the required block of information from the core storage array 6 to the calculator 22 has been completed.

By way of example to further illustrate the operation of the present system, let us assume that some condition existed in the calculator 22 at the time that the address ring 51 was set at position 038 and the stop register 15 was set at position 045 which indicated that the information comprehending the address of this group of positions in core storage array 6 should be stored. It will be remembered that a word consists of eleven characters and that it is necessary that a word have all eleven positions filled with valid information in order to pass the validity check circuits of the system. It is thus necessary to fill in the positions not occupied with the data from the ring 51 and register 15 with valid characters. The three character output channel 54 from ring 51 will feed start-stop storage mechanism 87 three characters of the word. The three character stop register 15 will feed three characters over channel 85 to the same start-stop storage mechanism 87 to fill an additional three positions of the word. This leaves five positions that must be filled in by valid characters. One of the functions of the start-stop storage mechanism 87 is to fill in these five characters. As the complete word is built by the start-stop storage mechanism 87, the word is transmitted over channel 125 in serial fashion to mix 91, from mix 91 over channel 92 to switch 94 and under control of line 95 to mix 93 and thus over channel 14 through switch 108 to the serial-to-parallel converter 19 to be placed in the one word register 18. From the one word register 18, the data comprehending the start-stop address of the core storage array 6 is transmitted over channel 9 through switch 111, through mix 37, over channel 115 to the inhibit drivers 38, and from inhibit drivers 38 over channel 39 to the core storage array. The address in the core storage array 6 at which this data will be stored is under control of the address register of the calculator 22. This data to address the core storage array 6 is fed over channel 105, FIG. 2*b*, through the two-out-of-five to decimal translator 23, over channel 57, through switch 49 now opened by line 62, through mix 45, and over channel 34 to the decoder 33 to select the desired X and Y coordinate drivers to store the data as required in the proper position of the core storage array 6.

A transfer of data from the calculator 22 to the core storage array 6 will be accomplished in the reverse manner that data is transferred from the core storage array 6 to the calculator. That is, the data from the calculator will appear from either channel 1 or channel 2 and be switched to channel 14 to be fed through the serial-to-parallel converter to the one word register and from the one word register to the inhibit drivers 38. The addressing for the core storage array under a transfer of data from the calculator to the core storage array will be in the same manner as described above. Namely, the address ring 51 will be set to a start position, the stop register 15 will be set to stop position, and the ring 51 will advance through these required positions to address the core storage array 6 in accordance therewith and allow the data from the inhibit drivers to be placed in the proper position in core storage.

Data appearing on channel 14 is fed through switch 127 under control of control line 128 to the validity check circuit 132. This type of validity check circuit is well-known in the art and simply performs the function of determining that there are two and only two active lines in the five line channel. The data fed through switch 127 is input data to the core storage array. Output data from the core storage array to the calculator goes over channel 29. Data on channel 29 is fed through switch 129 under control of control line 131 to validity checking circuit 132. Thus, both the incoming and outgoing data from the core storage array 6 is checked for validity. Further, it may be noted that validity check circuit 132 checks one character at a time, thus requiring a minimum of equipment to check the validity of all data transmitted.

Going now to the tape storage units 24 and 25, it may be seen at FIG. 2*d* that data coming from or to unit 24 is stored temporarily in a register 133, and data coming from or going to tape unit 25 is stored temporarily in a register 134. The purpose of these registers 133 and 134 is to allow the tape units 24 and 25 to operate at their normal speeds and have data transferred thereto or therefrom without interrupting their normal operation. The data from registers 134 and 133 pass through a tape to two-out-of-five translator to make the codes of the core storage and the tapes compatible. Data passing from the core storage to the tape units 24 and 25 are fed through the two-out-of-five to tape translator 136 and from this translator to one of the two registers 133 or 134 depending on which tape unit 24 or 25 the data is intended for. The structure to switch this data to one or the other of the tape units 24 or 25 is shown in FIG. 2*d* as switches 144 and 151. It should be noted that the data coming from the tape units 24 or 25 is in serial form and that switches 152 and 153 control the entry to translator 135.

Since data coming from the tape units 24 and 25 are in serial form, and since data going to the tape units 24 and 25 must be in serial form, data from the core storage array going to the tape units must be translated into a serial form from the parallel form in which they come from the sense register 7. Also, data going to the core storage array 6 from the tape units 24 and 25 must be translated from the serial form to the parallel form in order to be entered into the core storage array 6. The function of the digit selection circuit 26 and the digit insertion circuit 28 operating with the digit ring 141 and the digit ring 142 is to perform these functions of translating from serial to parallel and from parallel to serial in such a manner as to make the tape units 24 and 25 compatible with the core storage array 6. First, let us consider the transfer of a word of data from the core storage array 6 to a tape unit. As will be recalled, the word from the core storage array 6 appears in the sense register 7 under control of the address rings 52 and 53 as previously described. Address ring 52 is associated with tape unit 24 and address ring 53 is associated with tape unit 25. Thus, if it is desired to transfer data to or from tape unit 24, address ring 52 is brought into play to address the core storage array. Likewise, if it is desired to transfer data to or from tape unit 25, address ring 53 is brought into play to address the core storage array. Digit ring 141 is a latch ring having eleven positions, one for each character of a word. Digit ring 142 is a similar ring. These rings may be constructed in accordance with the above-mentioned Hamilton et al. application, Serial No. 408,702. Let us assume that a first word of characters is standing in the sense register 7 and that it is desired to transfer this first word to tape unit 24. Address ring 52 addressed the core storage array to bring the word into the sense register 7. From the sense register 7, the fifty-five parallel lines of channel 8 feed into the fifty-five parallel lines of channel 117 and from channel 117 to digit selection circuit 26. The digit selection circuit 26 is an array of diode switch and mix circuits which, in the present example, is driven by the digit ring 141. Digit ring 141 controls digit selection circuit 26 to transmit the character from the lowest ordered position of sense register 7 to channel 143. From channel 143, this character is transmitted through translator 136 to tape unit 24. Switch 144, FIG. 2*d*, performs the switching from translator 136 to tape unit 24. After this first character has been transferred to tape unit 24, the entire contents of the sense register 7 is regenerated in the core storage array. The operation of digit ring 142 is interlaced with the operation of digit ring 141 to enable the concurrent transfer of words from the core array to tape units 24 and 25. Rings 141 and 142 alternately control digit selection circuit 126 such that the first digit ring 141 controls digit selection circuit 126 to select the first character from the sense register 7. Next, the digit ring 142 controls the digit selection circuit to select a character from a second word standing in the sense register 7. Next, digit ring 141 controls the digit selection circuit to select the next higher ordered character of the first word now again standing in sense register 7. Corresponding orders of the digit rings 141 and 142 need not come up one after the other, but rather for example, the lowest ordered position of digit ring 141 may first be activated, then the sixth position of digit ring 142 might be activated, then the next lowest ordered position of ring 141, etc. It is only necessary that digit rings 141 and 142 alternately control the digit selection circuit 26 in order that characters from two words in core array 6 be alternately placed on channel 143. The control by address rings 52 and 53 alternates in step with the alternation of rings 141 and 142 respectively such that address ring 52 reads a word from core storage and then ring 53 reads a word from core storage to the sense register. The output from digit ring 141 is fed through switch 146 under control of control line 147 and the output of digit ring 142 is fed through switch 148 under control of control line 149. Thus, in a timed sequence as may be seen at D and E of FIG. 3, first switch 146 is activated to connect the outputs of digit ring 141 to digit selection circuit 26 at the same time that address ring 52 is addressing core storage array 6. Control lines 147 and 59 are activated by the same pulse, FIG. 3, and control lines 149 and 61 are activated by the same pulse, FIG. 3. In a next interval of time, switch 148 is activated by control line 149 to connect output of digit ring 142 to digit selection circuit 26 at the same time that address ring 53 is controlling the addressing of core storage array 6. Thus, address ring 52 will first cause a word from core storage array 6 to be stored in sense register 7 and at this time digit ring 141 is active to control digit selection circuit 26 to transmit one character from the sense register 7 to the tape unit 24. In a next interval of time, after the word in sense register 7 has been transferred back to core storage to the position from which it came under control of address ring 52, address ring 53 is active to address the core storage array 6 to place a word from the position addressed thereby in the sense register 7. At the time that ring 53 is operative to address the core storage array 6, digit ring 142 is operative through switch 148 to control the digit selection circuit to transmit one character from this word to tape unit 25. In a timed sequence with the operation of address rings 52 and 53 and digit rings 141 and 142, the address ring 51 may be brought into play to transmit a word from the core array 6 to the one word register. The operation would then be, for example, first digit ring 141 and address ring 52 are active to transmit a single character of data from the sense register 7 to tape unit 24. Next, digit ring 142 and address ring 53 are active to transfer a single character of data from another word appearing in sense register 7 to tape unit 25. Next in time sequence, address ring 51 is active to transfer a word of data from the core storage array 6 to the sense register 7. From sense register 7 the entire word is transmitted in parallel to the one word register 18. From the one word register 18, the characters are serially transmitted to calculator 22 at the same time that digit rings 141 and 142 with their corresponding address rings 52 and 53 are operating to transfer characters from two other words in core storage to the two tape units 24 and 25. It should be noted here that the completion of a cycle by the digit ring 141 serves as the advance signal for address ring 52; that is, the output from the last or eleventh order of digit ring 141 is connected to the advance circuit of address ring 52. Also, the last position of the digit ring 142 is connected to the advance circuit of address ring 53 to advance address ring 53. Thus, when a block of data from the core storage array 6 is to be transferred to a tape unit, the associated address ring 52 or 53 is set at a start position and its associated stop register is set at the stop position while the digit ring associated therewith advances the address ring until the address ring output is the same as the output from the stop register. In this manner, the two tape units and the storage drum of the calculator may jointly operate with the core storage array 6 to make maximum use of the high speed operation characteristics of the core storage array 6.

To review the timing relations between the several above-described circuits, reference is made to FIG. 3. The waveforms of FIG. 3 are to a common time base, thus the sequence of application of the various waveform signals may be seen.

The time base of FIG. 3 is in terms of the digit, or character, timing ring of calculator 22. Waveforms A, B and C are the output signals of clock 35. Waveform A is applied to the switch core circuit 32 as will be recalled from the above description. Waveform B is applied to time the operation of the sense circuits of the core array. Waveform C is applied to the inhibit drivers 38 and to switch core circuit 32 when entering data into the core storage array. Clock 35 may be activated to produce these three signals in sequence by a signal from the calculator, by the signal of waveform D described below or by the signal of waveform E, described below. The signal shown by waveform D is applied to control line 147 of switch 146, FIG. 2*c*, and also to control line 59 of switch 47, FIG. 2*b*. This signal causes ring 52 and ring 141 to be active together. The signal of waveform E is applied to control line 149 of switch 148, FIG. 2*c*, and to control line 61 of switch 48 to cause rings 53 and 142 to operate together.

The signal shown at F is applied to control lines 154 and 155 of switches 144 and 153 respectively, to connect tape unit 24 with the core storage array. The signal shown at G is applied to control lines 156 and 157 of switches 151 and 152 respectively, to connect tape unit 25 to the core array. The selection of the direction of the transfer from or to tape units 24 and 25 is under control of control lines 161, 162, 163 and 164 shown at the above switches.

The signal shown at H is applied to advance line 158 of digit ring 141 to advance ring 141. The signal shown at I is applied to advance line 159 of digit ring 142 to advance ring 142.

The signals shown at J and K are applied to advance lines 165 and 166 respectively, to advance address rings 52 and 53 respectively. The signals shown at J and K are respectively related to the signals shown at H and I since the J and K pulses are taken from the eleventh positions of digit rings 141 and 142 respectively. These J and K pulses are shown dotted since they represent only the time at which a pulse might occur. A pulse will actually occur only when the corresponding digit ring completes a cycle.

The time divisions shown at P are the digit times of the calculator 22. The time divisions shown at 0 are the word times of the calculator 22. The heavy lines shown at L are the time intervals allocated to the calculator 22 by the core storage system. The heavy lines shown at M are the time intervals allocated to the tape unit 24 by the core storage system. The heavy lines shown at N are the time intervals allocated to the tape unit 25 by the core storage system.

From the above description it may be seen how a plurality of slow speed storage devices are efficiently operated with the high speed static data storage apparatus.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine the combination comprising a magnetic core data storage array having a plurality of addressable positions each position adapted to store a plurality of characters, a first sense register having a plurality of character storage positions and adapted to simultaneously store all the characters from a position in said storage array, first addressing means for repeatedly reading all the characters out from a first position in said storage array in parallel to said register, a transmission channel for serially transmitting data comprehending single characters, first switching means for selectively connecting successive positions of said register to said channel to transmit the character stored in said register at the selected position over said channel, means for reading all the characters out from said register in parallel to said storage array after each transmission of a character over said channel, second addressing means for reading all the characters out in parallel from a second position in said storage array to said register after each repeated reading out of the characters from said first position in said storage array, and second switching means for selectively connecting successive positions of said register to said channel, whereby successive characters from said first and said second positions in said storage array are alternatingly transmitted over said channel.

2. In a data processing machine the combination comprising a magnetic core data storage array having a plurality of addressable positions each position adapted to store a plurality of characters, a first sense register having a plurality of character storage positions and adapted to simultaneously store all the characters from an addressable position in said storage array, first addressing means for repeatedly reading all the characters out from a first position in said storage array in parallel to said register, a transmission channel for serially transmitting data comprehending single characters, first switching means for selectively connecting successive positions of said register to said channel to store the character transmitted over said channel in said register at the selected position, means for reading all the characters out from said register in parallel to said storage array after each transmission of a character over said channel, second addressing means for reading all the characters out from a second position in said storage array in parallel to said register after each repeated reading out of the characters from said first position in said storage array, and second switching means for selectively connecting successive positions of said register to said channel to store the character transmitted over said channel in said register at the position selected by said second switching means, whereby successive characters transmitted over said channel are alternately stored in said first and said second positions of said storage array.

3. Apparatus according to claim 1 wherein said first and said second addressing means each comprise a ring having an output and means for repeatedly activating outputs from alternate rings to effect readouts from said storage array.

4. Apparatus according to claim 3 wherein said first and said second switching means each comprise a ring having a plurality of outputs and means for successively activating outputs from alternate rings.

5. Apparatus according to claim 4 wherein said first and said second switching means each include means for periodically advancing a ring of said adressing means.

6. Apparatus according to claim 5 further characterized by the provision of a pair of slow speed storage devices and means for alternately connecting said channel to said slow speed storage devices.

7. Apparatus according to claim 5 further characterized by the provision of a third addressing means for reading all the characters out in parallel from a third position in said storage array to said register in a timed sequence related to the operation of said first and said second addressing means, a second register having a plurality of character storage positions and adapted to simultaneously store all the characters from an addressable position in said storage array, and means for transferring the characters stored in said first register in parallel to said second register.

8. Apparatus according to claim 7 further characterized by the provision of validity checking means, third switching means for selectively connecting successive positions of said second register to said validity checking means, and means for transferring the characters stored in said second register in parallel to said storage array, whereby a serial validity check is performed on a plurality of characters transferred in parallel within said storage array.

9. Apparatus according to claim 2 wherein said first and said second addressing means each comprise a ring having an output and means for repeatedly activating outputs from alternate rings to effect readouts from said storage array.

10. Apparatus according to claim 9 wherein said first and said second switching means each comprise a ring having a plurality of outputs and means for successively activating outputs from alternate rings of said switching means.

11. Apparatus according to claim 10 wherein said first and said second switching means each include means for periodically advancing a ring of said addressing means.

12. Apparatus according to claim 11 further characterized by the provision of a pair of slow speed storage devices and means for alternately connecting said channel to said slow speed storage devices.

13. Apparatus according to claim 11 further characterized by the provision of a third addressing means for reading all the characters out in parallel from a third position in said storage array to said register in a timed sequence related to the operation of said first and said second addressing means, a second register having a plurality of character storage positions and adapted to simultaneously store all the characters from an addressable position in said storage array, and means for transferring the characters stored in said first register in parallel to said second register.

14. Apparatus according to claim 13 further characterized by the provision of validity checking means, third switching means for selectively connecting successive positions of said second register to said validity checking means, and means for transferring the characters stored in said second register in parallel to said storage array, whereby a serial validity check is performed on a plurality of characters transferred in parallel within said storage array.

15. In a data processing machine, the combination comprising: a static storage apparatus having a plurality of randomly addressable storage locations for storing and issuing data, a first ring for storing data representing any one of said plurality of storage addresses, means for advancing said first ring to represent successive ones of said storage locations, a second ring for storing an end address of said storage addresses, a comparing means for comparing the successive address with said end address, means for transmitting data into or out of said successive storage locations, and means responsive to said comparing means when one of said successive address locations equals said end address to disable said means for transmitting data to thereby terminate the transmission of data.

References Cited in the file of this patent

UNITED STATES PATENTS

| | | |
|---|---|---|
| 2,540,654 | Cohen | Feb. 6, 1951 |
| 2,854,652 | Smith | Sept. 30, 1958 |
| 2,954,166 | Eckdahl | Sept. 27, 1960 |